United States Patent
Benkler et al.

(10) Patent No.: US 7,954,883 B2
(45) Date of Patent: Jun. 7, 2011

(54) ENERGY-ABSORBING DEFORMATION ELEMENT FOR A VEHICLE

(75) Inventors: Olaf Benkler, Neuhausen/Schellbronn (DE); Markus Osswald, Leonberg-Hoefingen (DE); Matthias Zierle, Filderstadt (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/037,467

(22) Filed: Feb. 26, 2008

(65) Prior Publication Data

US 2008/0265622 A1 Oct. 30, 2008

(30) Foreign Application Priority Data

Apr. 26, 2007 (DE) .......................... 10 2007 019 700

(51) Int. Cl.
  *B60R 21/04* (2006.01)
  *B62D 25/06* (2006.01)
(52) U.S. Cl. .............. 296/187.05; 296/187.13; 296/210; 296/214
(58) Field of Classification Search ............. 296/187.05, 296/187.13, 210, 214, 187.03; 188/371; 280/748, 751
See application file for complete search history.

(56) References Cited

U.S. PATENT DOCUMENTS

| | | | | |
|---|---|---|---|---|
| 5,040,646 A * | 8/1991 | Drefahl | ......................... | 188/371 |
| 5,564,744 A * | 10/1996 | Frost | .............................. | 280/751 |
| 5,791,716 A * | 8/1998 | Takagi et al. | ................ | 296/39.1 |
| 5,975,623 A * | 11/1999 | Shikimachi et al. | ..... | 296/187.05 |
| 5,979,139 A * | 11/1999 | Early | ........................... | 52/791.1 |
| 6,036,227 A * | 3/2000 | Lin et al. | ....................... | 280/751 |
| 6,041,176 A * | 3/2000 | Shiell | ............................ | 703/27 |
| 6,042,176 A * | 3/2000 | Ikeda et al. | ............. | 296/187.05 |
| 6,199,941 B1 * | 3/2001 | Takahara et al. | ........ | 296/187.05 |
| 6,293,614 B1 * | 9/2001 | Takahara et al. | ........ | 296/187.05 |
| 6,315,350 B1 * | 11/2001 | Nakane et al. | ........... | 296/187.05 |
| 6,394,536 B2 * | 5/2002 | Takahara | ................. | 296/187.05 |
| 6,397,553 B1 * | 6/2002 | Horikawa et al. | ........ | 296/187.05 |
| 6,517,144 B2 * | 2/2003 | Kobayashi | ............... | 296/187.05 |
| 6,616,219 B2 | 9/2003 | Benkler | | |
| 6,779,835 B2 * | 8/2004 | Fox et al. | ................. | 296/187.05 |
| 6,869,119 B2 * | 3/2005 | Ito et al. | ........................ | 296/1.02 |
| 7,229,124 B2 * | 6/2007 | Luik et al. | ................ | 296/187.05 |
| 7,249,662 B2 * | 7/2007 | Itou | .............................. | 188/377 |
| 2002/0074828 A1 | 6/2002 | Benkler | | |
| 2003/0107242 A1 * | 6/2003 | Fox et al. | ...................... | 296/189 |

FOREIGN PATENT DOCUMENTS

| | | |
|---|---|---|
| DE | 100 63 339 | 12/2001 |
| DE | 100 63 339 C1 | 12/2001 |
| DE | 101 01 450 A1 | 7/2002 |
| DE | 10 2004 058 249 A1 | 6/2006 |
| EP | 1 043 214 A2 | 10/2000 |
| EP | 1 808 363 A1 | 7/2007 |

* cited by examiner

*Primary Examiner* — Glenn Dayoan
*Assistant Examiner* — Gregory Blankenship
(74) *Attorney, Agent, or Firm* — Gerald E. Hespos; Michael J. Porco

(57) ABSTRACT

An energy-absorbing deformation element is provided for a vehicle, in particular a motor vehicle, wherein the deformation element in the mounted state is arranged in a collision region between a covering part and a vehicle body, and more particularly, between a headliner and a vehicle roof. The deformation element has an essentially U-shaped profile, on free end regions of which is disposed a flange at least in certain regions. A plurality of cutouts or recesses are provided in the flanges on each free end region.

9 Claims, 3 Drawing Sheets

US 7,954,883 B2

ENERGY-ABSORBING DEFORMATION ELEMENT FOR A VEHICLE

CROSS-REFERENCE TO RELATED APPLICATION

This application claims the priority of German Application No. 10 2007 019 700.6, filed Apr. 26, 2007, the disclosure of which is expressly incorporated by reference herein.

BACKGROUND AND SUMMARY OF THE INVENTION

The invention relates to an energy-absorbing deformation element for a vehicle, in particular a motor vehicle, wherein the deformation element in the mounted state is arranged in a collision region between a covering part and a vehicle body, in particular, between a headliner and a vehicle roof.

German patent document DE 100 63 339 discloses an energy-absorbing deformation element for absorbing the impact energy in pillars, supports, and the like, for motor vehicles. This deformation element is arranged in a body structure between a body shell element and an interior-covering part and consists of a latticed element. The deformation element includes U-shaped profiles, which are arranged at a distance from each other. Each U-shaped profile exhibits a web and reinforcing webs, which are arranged so as to be directed transversely between legs. The profiles are connected to an elongated component, which is arranged in at least one plane, by way of connecting webs. The manufacture of the deformation element is expensive owing to the various components.

German patent document DE 10 2004 058 249 A1 discloses a deformation element, which is formed by two deformation walls, which are arranged at a distance from each other and which are oriented in essence parallel to each other and which are connected to at least one connecting element to form a one-piece component. A flange is disposed on a free end region of the deformation walls. In this case, the manufacture of the deformation element is simplified. However, the design of the deformation element does not always offer the occupants optimal protection.

An object of the invention is to provide a deformation element intended for a vehicle, in particular for a motor vehicle, that is easy to manufacture and offers the vehicle occupants better protection.

According to the invention, an energy-absorbing deformation element is provided for a vehicle, in particular a motor vehicle, wherein the deformation element in the mounted state is arranged in a collision region between a covering part and a vehicle body, in particular, between a headliner and a vehicle roof. The deformation element has an essentially U-shaped profile, on free end regions of which is disposed a flange at least in certain regions. A plurality of cutouts are arranged in the flanges. Advantageous further developments of the inventive deformation element are described herein.

The inventive deformation element exhibits an essentially U-shaped profile, on the free end regions of which is disposed a flange at least in certain regions. A plurality of cutouts or recesses are provided in the flanges. This design makes it possible to manufacture a deformation element in a simple manner. The deformation element has improved deformation properties and offers the vehicle occupants better protection.

In an advantageous further development, the cutouts extend into the walls of the U-shaped profile as far as to the base part of the U-shaped profile. In this design, the deformation element is readily deformed.

In another advantageous further development, the cutouts are situated directly opposite each other in opposite flanges. In this way advantageous deformation properties of the deformation element are achieved.

In yet another advantageous further development, the cutouts in opposite flanges are offset from one another in the longitudinal direction of the U-shaped profile. In this way, additional advantageous deformation properties of the deformation element are achieved.

It is clear that the aforementioned features and those features to be explained below can be applied not only in the respectively cited combination, but also in other combinations or by themselves alone without departing from the scope of the present invention.

Other objects, advantages and novel features of the present invention will become apparent from the following detailed description when considered in conjunction with the accompanying drawings.

BRIEF DESCRIPTION OF THE DRAWINGS

The invention is depicted schematically in the drawings with reference to a number of embodiments and is described in detail below with reference to the drawings.

DETAILED DESCRIPTION OF THE DRAWINGS

Figure 1:
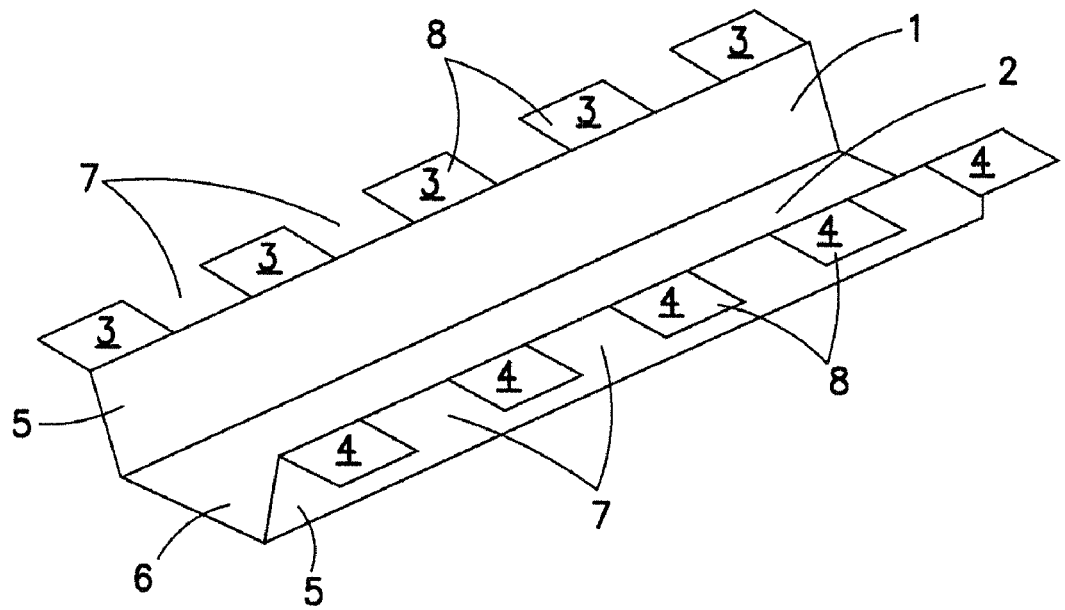
FIG. 1 is a schematic perspective view of a deformation element, according to one embodiment of the invention.

FIG. 1 depicts an energy-absorbing deformation element 1 in accordance with one embodiment of the invention. The deformation element 1 in the mounted state is arranged in a collision region between a covering part of a vehicle and a vehicle body. The deformation element 1 is arranged, in particular, between a headliner 9 (cf., for example, FIG. 5) and a vehicle roof 11 (cf., for example FIG. 5). However, it may also be arranged in the vehicle pillars or the like.

The deformation element 1 consists of an essentially U-shaped profile 2, on the free end regions of which is disposed a flange 3, 4 at least in certain regions. The essentially U-shaped profile 2 includes two deformation walls 5, which in the mounted state are aligned in essence parallel to each other and which are connected to at least one base part 6 to form a one-piece component. The deformation element 1 is made preferably of sheet metal or a plastic material.

The flanges 3, 4 project preferably laterally beyond the free ends of the deformation walls 5 of the U-shaped profile. Furthermore, the flanges may be bent off in relation to the deformation walls 5 in such a manner that the flanges are flush with the contour of the vehicle body.

The invention provides a plurality of recesses or cutouts 7 in the flanges. In the event that the size of the cutouts or the recesses 7 is changed, the deformation properties may be adapted in a simple manner. Preferably, the recesses or cutouts 7 are designed rectangular, as can be inferred from the figures. In the embodiment shown in FIG. 1, the cutouts 7 in the flanges 3, 4 extend up to the corresponding walls 5 of the U-shaped profile 2. The number of cutouts 7 and the distance between the adjacent cutouts 7 may be selected in such a manner that the desired deformation properties are obtained. In the advantageous embodiment shown in FIG. 1, the size of the cutouts 7 is equal to the size of the remaining flanges (or tabs 8 remaining in between). Preferably, the height of the deformation walls matches the distance between the covering part (for example, the headliner) and the vehicle body (for example, the vehicle roof), so that in the mounted state the flanges 3, 4 of the deformation element abut in a contact connection there.

Figure 2:
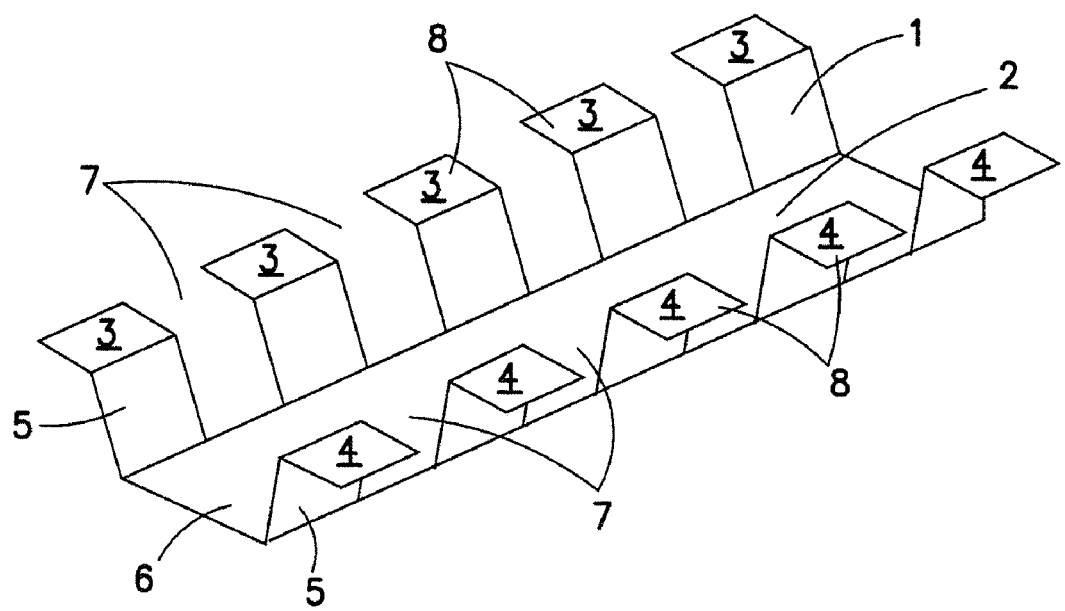
FIG. 2 is a schematic perspective view of a deformation element, according to another embodiment of the invention.

FIG. 2 depicts an energy-absorbing deformation element 1, according to another preferred embodiment of the invention. The identical elements are provided with identical reference numerals. In this embodiment, the cutouts or recesses 7 extend into the deformation walls 5 and preferably as far as the base area or the base part 6 of the U-shaped profile. Therefore, the rigidity of the deformation element 1 is reduced. The cutouts or recesses 7 are provided in the opposite flanges 3, 4 and deformation walls 5; and the cutouts or recesses 7 are situated directly opposite one another. The number of cutouts 7 and the distance between the adjacent cutouts 7 may be selected, in turn, in such a manner that the desired deformation properties are obtained. In the advantageous embodiment shown in FIG. 2, the width of the cutouts 7 is equal to the width of the flanges or tabs 8 remaining in between the cutouts.

Figure 3:
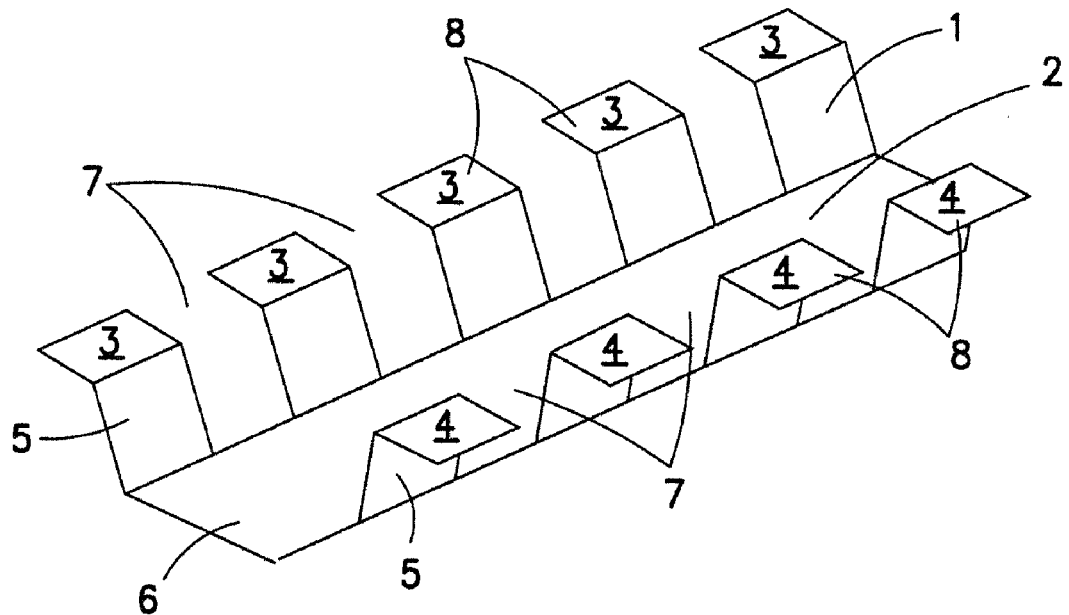
FIG. 3 is a schematic perspective view of a deformation element, according to another embodiment of the invention.

FIG. 3 depicts a further development of the deformation element 1 shown in FIG. 2. In this case, the cutouts or recesses 7 in opposite flanges 3, 4 and deformation walls 5 are offset from one another in the longitudinal direction of the U-shaped profile 2.

Figure 4:
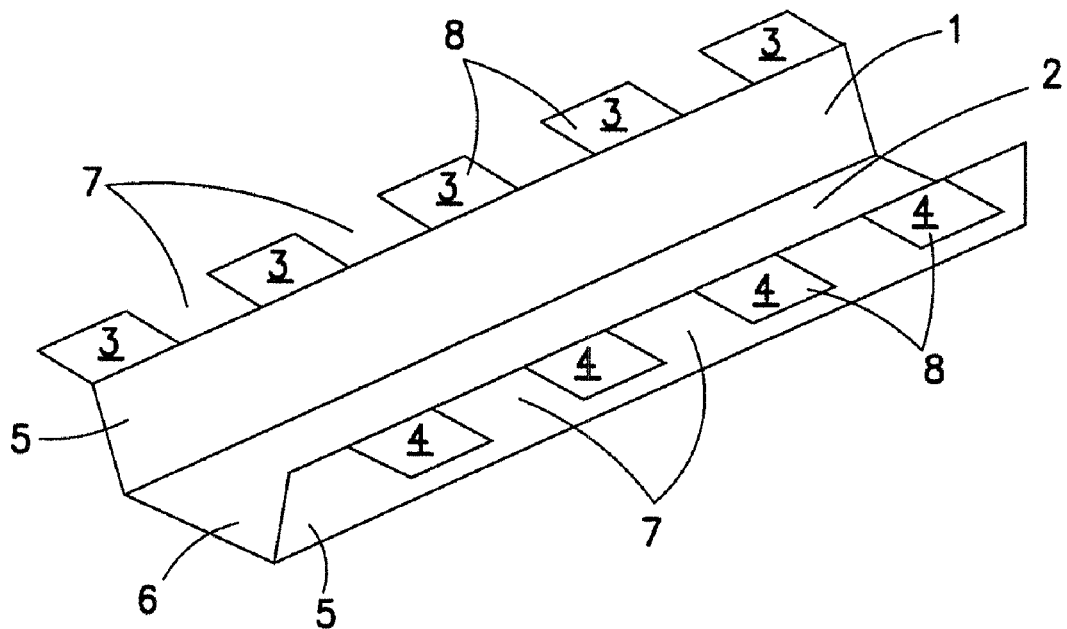
FIG. 4 is a schematic perspective view of a deformation element, according to another embodiment of the invention.

FIG. 4 depicts a further development of the deformation element 1 shown in FIG. 1. In this case, the cutouts or recesses 7 in opposite flanges 3, 4 are offset from one another in the longitudinal direction of the U-shaped profile 2.

Figure 5:
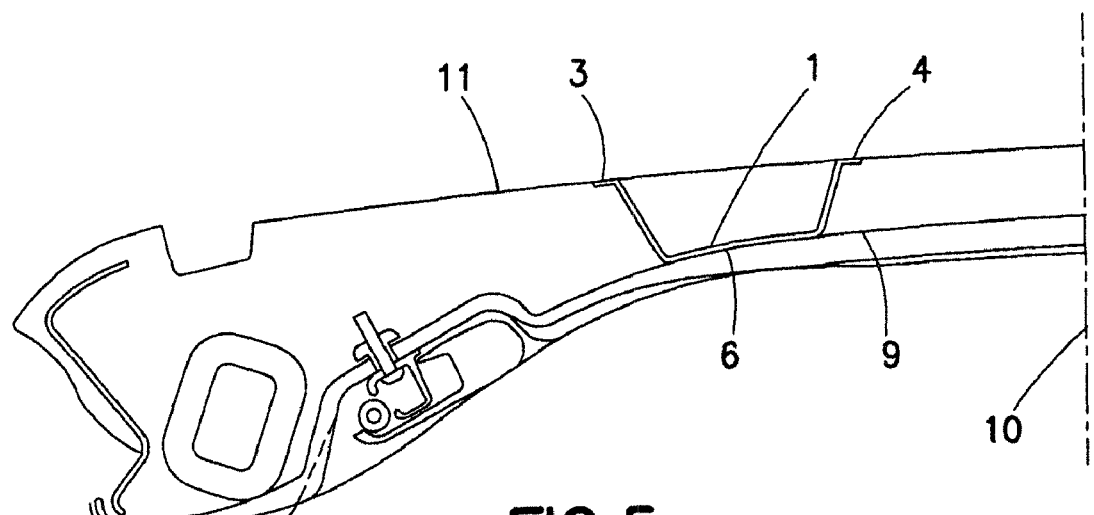
FIG. 5 is a schematic cross sectional view of an inventive deformation element in the mounted state on the vehicle headliner.

FIG. 5 depicts the configuration of the deformation element 1 between a headliner 9 and a vehicle roof 11 of a vehicle. In this case, it is clear that the underside of the base part 6 is connected to a rear side of the headliner 9. Preferably, the underside of the base part 6 is adhesively cemented to the rear side of the headliner 9. Furthermore, the profile of the base part 6 may be configured in such a manner that it runs flush with the contour of the headliner 9.

The two deformation walls 5 run between the headliner 9 and the roof 11 of the vehicle. Preferably, the flanges 3, 4 project laterally beyond the free ends of the deformation walls 5 of the U-shaped profile 2. As stated above, the flanges 3, 4 may be bent or angled in relation to the deformation walls 5 such that the flanges run flush with the contour of the roof 11 of the vehicle.

Figure 6:
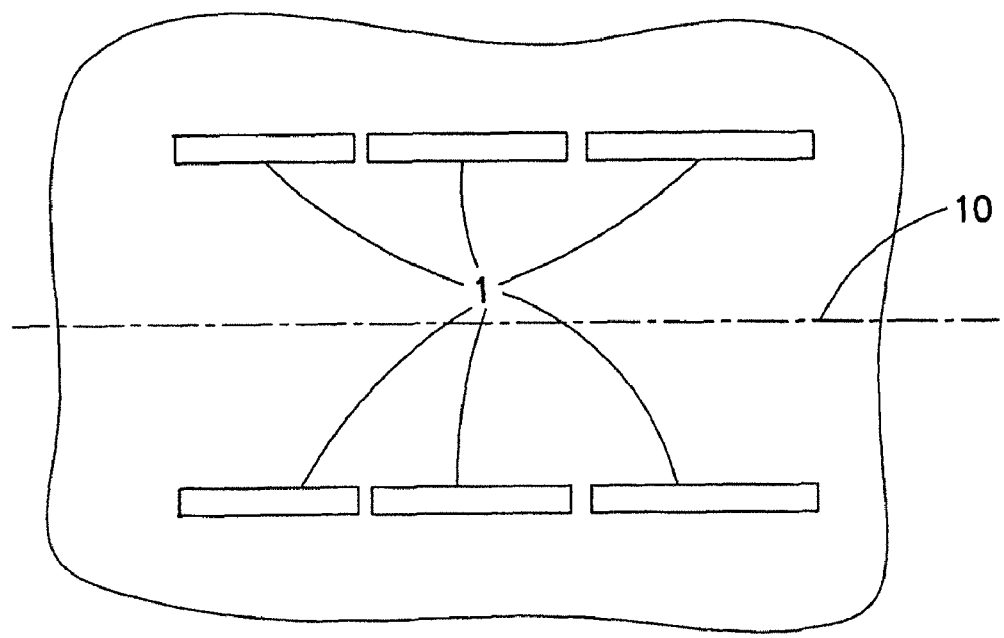
FIG. 6 is a top view of the vehicle headliner with a plurality of inventive deformation elements.

The center line of the vehicle is marked with the reference numeral 10 in FIGS. 5 and 6. From these figures, it is understood that the deformation element 1 is arranged on the side of the vehicle. Furthermore, the longitudinal direction of the deformation element in the mounted state matches the longitudinal direction of the vehicle in order to obtain better protection for the occupants. A plurality of deformation elements 1 are provided in the longitudinal direction of the vehicle.

The preceding description of the embodiments according to the present invention has been set forth merely to illustrate the invention and is not intended to limit the invention. In particular, with respect to a few preferred embodiments, the person skilled in the art may infer that a variety of changes and modifications may be made to the design and individual features without departing from the idea and scope of the invention. Therefore, the disclosure of the present invention should not be construed to be limiting. Rather the disclosure of the present invention shall illustrate the scope of the invention, which is presented in the following claims.

What is claimed is:

1. A roof configuration for a vehicle, comprising:
a headliner;
a vehicle roof operatively arranged with respect to the headliner; and
a plurality of energy-absorbing deformation elements operatively arranged in a collision region between the headliner and the vehicle roof;
wherein each deformation element comprises a one-piece component with an essentially U-shaped profile in a longitudinal direction, the essentially U-shaped profile comprising a base part with opposite first and second longitudinal sides, the base part being secured to the headliner, at least one first deformation wall extending from the first side of the base part and away from the headliner, at least one second deformation wall extending from the second side of the base part and away from the headliner, a plurality of longitudinally spaced first flanges being disposed on a side of the first deformation wall opposite the base part, the longitudinal spaced first flanges being in a contact connection with the vehicle roof, a plurality of first cutouts arranged between the respective longitudinally spaced first flanges, a plurality of longitudinally spaced second flanges being disposed on a side of the second deformation wall opposite the base part, the longitudinal spaced second flanges being in contact connection with the vehicle roof, and a plurality of second cutouts arranged between the respective longitudinally spaced second flanges, the deformation walls of the U-shaped profile have respective heights matching a distance between a headliner and the roof of the vehicle, whereby in the mounted state of the deformation element, the base part abuts with a contour of the headliner and the flanges are angled in relation to the deformation walls flanges to run flush with a contour of the roof with a contact connection.

2. The roof configuration according to claim 1, wherein connections between the two deformation walls and the base part are substantially parallel to one another.

3. The roof configuration according to claim 1, wherein the cutouts in each of the flanges extend at least into a respective deformation wall forming a side of the U-shaped profile.

4. The roof configuration according to claim 3, wherein with respect to the flanges arranged on opposing deformation walls forming sides of the U-shaped profile, the cutouts are arranged to either be situated directly opposite one another or to be situated offset from one another along the longitudinal direction of the U-shaped profile.

5. The roof configuration according to claim 1, wherein the vehicle has a longitudinal direction and the longitudinal direction of the deformation element is aligned substantially with the longitudinal direction of the vehicle.

6. The roof configuration according to claim 1, wherein the cutouts extend substantially to the base part.

7. A motor vehicle comprising: a headliner adjacent an interior of the vehicle, a vehicle roof spaced outwardly from the headliner and a unitary energy-absorbing deformation element comprising a base having first and second ends spaced apart along a longitudinal direction of the vehicle, the base being flush with a contour defined by the headliner and being secured in abutting contact with the headliner, first and second sides extending from the first end to the second end, a first deformation wall extending from the first side of the base and aligned at an angle to the base, a plurality of longitudinally spaced first flanges extending angularly from end regions of the first deformation wall remote from the base so that a plurality of first cutouts are arranged between the respective first and second flanges, each of the first flanges being bent in relation to the first formation wall to be substantially flush with a contour defined by the vehicle roof and to be substantially in connection with the vehicle roof, a second deformation wall extending angularly from the second side of the base so that the second deformation wall is substantially opposed to the first deformation wall, a plurality of second flanges extending from locations on the second deformation wall remote from the base, the second flanges being angularly aligned to the second deformation wall and being oriented so that the first and second flanges project in substantially opposite directions, the second flanges running flush with a contour of the vehicle roof and being in a contact connection with the vehicle roof, a plurality of second cutouts being defined between the respective second flanges, the deformation walls having projecting distances measured from the base substantially matching a distance between the headliner and the vehicle roof so that portions of the deformation elements adjacent the flanges abut the roof and the base abuts the headliner with a contact connection.

8. The structural component of claim 7, wherein the first and second cutouts extend into the respective first and second deformation walls and at least partly toward the base.

9. The structural component of claim 7, wherein the first and second deformation walls diverge from one other at farther distances from the base and wherein each of the flanges and each of the cutouts has a longitudinal dimension extending parallel to the longitudinal direction of the base, the longitudinal dimension of the flanges and the cutouts being approximately equal to one another.

\* \* \* \* \*